(12) United States Patent
Hermansson et al.

(10) Patent No.: US 10,138,927 B2
(45) Date of Patent: Nov. 27, 2018

(54) BALL JOINT CONNECTOR (71) Applicant: KONGSBERG AUTOMOTIVE AB, Mullsjoe (SE)

(72) Inventors: Bengt Hermansson, Mullsjoe (SE); Patrik Sundberg, Habo (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 0 days.

(21) Appl. No.: 15/103,672

(22) PCT Filed: Dec. 12, 2013

(86) PCT No.: PCT/EP2013/076356
§ 371 (c)(1),
(2) Date: Jun. 10, 2016

(87) PCT Pub. No.: WO2015/086071
PCT Pub. Date: Jun. 18, 2015

(65) Prior Publication Data
US 2016/0312822 A1    Oct. 27, 2016

(51) Int. Cl.
F16C 11/06    (2006.01)
F16C 1/10    (2006.01)
F16C 1/14    (2006.01)

(52) U.S. Cl.
CPC ............ F16C 11/069 (2013.01); F16C 1/108 (2013.01); F16C 1/14 (2013.01); F16C 11/0623 (2013.01);
(Continued)

(58) Field of Classification Search
CPC . F16C 11/0628; F16C 11/0642; F16C 11/069; F16C 11/0695; F16C 11/106;
(Continued)

(56) References Cited

U.S. PATENT DOCUMENTS

RE31,635 E * 7/1984 Smith ................... F16C 11/069
                                                    403/122
4,895,472 A * 1/1990 Dony .................. F16C 11/0657
                                                    403/133
(Continued)

FOREIGN PATENT DOCUMENTS

DE    19824530 A1 * 12/1998 .......... F16C 11/0638
DE    19640504 C2    2/1999
(Continued)

OTHER PUBLICATIONS

International Search Report and Written Opinion for Application No. PCT/EP2013/076356 dated Sep. 9, 2014, 9 pages.
(Continued)

*Primary Examiner* — Josh Skroupa
*Assistant Examiner* — Cory B Siegert
(74) *Attorney, Agent, or Firm* — Howard & Howard Attorneys PLLC (57) ABSTRACT

A ball joint connector for connecting an elongated element to a ball pin includes a socket having a cylindrical cavity for receiving a ball of a ball pin with an opening at one end and a dome-shaped end wall at the opposite end, and a clip disposed at least partially within the cavity and dimensioned to encompass more than the upper hemisphere of the ball, the clip being moveable between a locking position and a retracted assembly/disassembly position characterized in that the clip is arranged to extend, in its locking position, in abutment with the surface of a ball received in the cavity on opposing sides of the ball on each side over a portion of the upper hemisphere and with its lower end portion over an adjoining surface portion of the lower hemisphere.

15 Claims, 6 Drawing Sheets

(52) U.S. Cl.
CPC ...... *F16C 11/0652* (2013.01); *F16C 2226/74* (2013.01); *Y10T 403/32737* (2015.01)

(58) Field of Classification Search
CPC .... F16C 2226/74; F16C 11/10; F16C 11/103; F16C 11/0652; F16C 11/0623; Y10T 403/32737; Y10T 403/32745; Y10T 403/32786; Y10T 403/32803; Y10T 403/32811
USPC .................. 403/135, 136, 138, 141, 143
See application file for complete search history.

(56) References Cited

U.S. PATENT DOCUMENTS

| | | | | |
|---|---|---|---|---|
| 5,395,176 | A * | 3/1995 | Zivkovic | B60G 7/005 403/122 |
| 5,613,792 | A | 3/1997 | Terada et al. | |
| 7,044,018 | B2 * | 5/2006 | Sanchez | F16C 1/108 403/135 |
| 7,226,233 | B2 * | 6/2007 | Sußenbach | F16B 21/186 403/122 |
| 7,993,070 | B2 * | 8/2011 | Kull | F16C 1/14 296/146.8 |
| 8,096,212 | B2 * | 1/2012 | Su | B25B 23/0028 403/135 |
| 2010/0047012 | A1 | 2/2010 | Kull et al. | |
| 2011/0150564 | A1 * | 6/2011 | Stefan | A61B 1/00149 403/136 |
| 2014/0205366 | A1 * | 7/2014 | Mevorach | B60G 7/005 403/144 |

FOREIGN PATENT DOCUMENTS

| | | | | |
|---|---|---|---|---|
| DE | 102007017949 | A1 | 10/2008 | |
| GB | 1105725 | A * | 3/1968 | ......... F16C 11/0657 |
| GB | 2235961 | A * | 3/1991 | ............ B60T 11/16 |
| GB | 2235961 | A | 3/1991 | |
| JP | 2007146982 | A * | 6/2007 | ............... F16C 7/02 |

OTHER PUBLICATIONS

English language abstract and machine-assisted English translation for DE19824530 extracted from espacenet.com database on Sep. 12, 2016, 12 pages.

English language abstract and machine-assisted English translation for DE19640504 extracted from espacenet.com database on Sep. 12, 2016, 12 pages.

English language abstract and machine-assisted English translation for DE102007017949 extracted from espacenet.com database on Sep. 12, 2016, 12 pages.

* cited by examiner

BALL JOINT CONNECTOR

The subject application is the National Stage of International Application No. PCT/EP2013/076356 filed on Dec. 12, 2013, the contents of which are expressly incorporated herein in their entirety.

The present invention relates to a ball joint connector for connecting an elongated element to a ball pin, comprising a socket having a cylindrical cavity for receiving a ball of a ball pin with an opening at one end and a dome-shaped end wall at the opposite end, said socket being adapted to be connectable to the elongated element, and a clip disposed at least partially within the cavity and dimensioned to encompass, when the ball is received in the cavity, more than its upper hemisphere opposite to the lower hemisphere on which the pin of the ball pin is coaxially carried, said clip being moveable between a locking position in which it extends with two opposite end portions into the lower hemisphere of the ball to be in abutment with surface portions in the lower hemisphere to hold the ball secured in the cavity, and a retracted assembly/disassembly position in which its opposite end portions allow the ball to pass for insertion/removal to/from the cavity.

Such connectors are for example needed for connecting an elongated element, such as a cable in a vehicle, to an end portion of a gearshift lever to transfer a control movement of the gearshift lever via a cable to a gearbox. The connector includes a ball pin in a cavity forming a ball joint which enable the pivotal movement of the end of the gear shift lever to be converted into a longitudinal movement of the cable. When constructing such a connector, there are several needs that need to be addressed. For instance, the connector must be easy to connect to the ball pin while retaining the ball in the connector in a secure manner. Advantageously the connector also has means which allow for a quick and easy dismounting of the ball pin from the connector without damaging the connector or the ball pin. Cost considerations are also an important aspect when constructing a connector which is to be utilized in large numbers in the automotive industry. This aspect includes that the design of the connector should allow to select cheap components, and components that are easy to be assembled to one another. Another important aspect under cost considerations is the precision to which the components must be manufactured to ensure proper operation of the assembled connector. Production deviations and tolerances in the components may lead to the result that the ball of the ball pin does not fit into the cavity of the connector at all such that the connector is rendered inoperable, or the ball does not well fit into the cavity such that the resulting connection exhibits free play. Further, in some applications, such as in a cable assembly for a gear shift system in a vehicle, it is desirable that the connector includes dampening means for reducing transmission of vibration from the gearbox to the gearshift lever.

U.S. Pat. No. 5,613,792 A discloses a ball joint connector comprising a socket having a cylindrical cavity for receiving a ball of a ball pin. The diameter of the cylindrical cavity is larger than the diameter of the ball. At its lower end opening the cavity has inwardly projecting portions which slightly reduce the diameter of the cavity at its lower end opening but which still allow the ball to pass the opening for insertion/removal of the ball to/from the cavity. A C-ring, i.e. a ring having a gap in its circumference, is disposed in the cavity extending in a plane perpendicular to the longitudinal axis of the cylindrical cavity. The C-ring is made of resilient but firm material and has an inner diameter slightly less than the diameter of the ball. When the ball is introduced into the cavity, the C-ring is spread open so that its gap in the circumference widens such that the ball can pass the ring. When the ring reaches the lower hemisphere of the ball the C-ring contracts under its own resilience and embraces the ball in a region of its lower hemisphere close to the pin of the ball pin. The outer diameter of the C-ring in its contracted state is larger than the free inner diameter left between the inwardly projecting portions at the lower end of the cavity opening so that the C-ring retains the ball in the cavity. The C-ring has to be made of a sufficiently rigid material, i.e. metal, in order to be able to hold the ball by its owns structural strength. A tool is needed to open the ring to dismount the ball pin from the socket. Furthermore, it is rather complicated to form the cavity with inwardly projecting portions close to its lower end opening.

DE 196 40 504 C2 describes a connector having a socket which has a generally cylindrical cavity with an inwardly projecting inner wall at its lower end adjoining the insertion opening, which projecting inner wall at its lower end is still of slightly larger inner diameter than the diameter of the ball. Inside the cavity there is an inner socket element of elastic material and having a receiving recess of complementary shape to the ball to embrace the ball around its upper hemisphere and partially around its lower hemisphere. The inner socket is moveable in longitudinal direction of the cavity from a locking position in which it extends with its lower end region into the lower hemisphere of the ball to be in abutment with surface portions in the lower hemisphere to hold the ball secured in the cavity, wherein the inner socket element rests in this position with its lower end region on the inwardly projecting inner wall of the cavity to hold the ball secured in the socket. The inner socket element is moveable to a retracted assembly/disassembly position in which its lower end region is lifted off the inwardly projecting inner wall of the cavity so that the lower opening of the inner socket element is able to be expanded radially outwardly to the cylindrical inner wall of the cavity to allow the ball to be inserted into or removed from the inner socket element and to pass through the insertion opening of the socket. The inner socket element is biased by an elastic element to be in abutment with its lower end region against the inwardly projecting inner wall of the cavity at its lower end portion adjoining the insertion opening. The inner socket element has a handle projecting from the socket at its end opposite to the insertion opening. By pulling the handle the inner socket element may be retracted to the assembly/disassembly position. Since the inner socket element is embracing the ball around its entire upper end parts of its lower hemisphere as a calotte or spherical cap, relatively high forces are needed to spread the opening at its lower end by widening the material around the entire circumference of the lower end opening. The material of the socket on the one hand has to be suitably elastic, but in addition has to have low friction with the ball that is almost entirely surrounded by the inner socket, so that the ball pin is able to pivot; this requirement limits the choice of material for the inner socket. In addition, the components must be made with high precision with respect to each other to ensure a proper cooperation of the socket cavity and the inner socket element. Finally, the forming of the cavity with an inwardly projections wall at the end adjoining the insertion opening is rather complicated.

DE 10 2007 017 949 A1 discloses a ball pin connector having a socket with a cavity in which a sleeve is moveably disposed and biased by an O-ring so that the lower end portion of the sleeve is urged against inwardly inclined inner wall surfaces of the socket. In this position the lower end portion of the sleeve is supported by the inwardly inclined inner wall surfaces of the socket so that a ball received in the sleeve is retained therein. The sleeve has two slots so that its lower end portion with the insertion opening is divided and may be spread to allow the ball to pass the insertion opening when the sleeve is moved to an assembly/disassembly position in which its lower end portion is lifted off the inwardly inclined inner wall surfaces of the socket. In this assembly again precisely matching dimensions of the sleeve and the socket and further components are needed to allow the connector to function properly and reliable. Also, the forming process to shape the cavity with inwardly inclined projection at the lower end is complicated.

U.S. Pat. No. 7,993,070 B2 discloses a ball joint connector according to the preamble of claim 1. The connector has a socket with an essentially cylindrical cavity having an inner diameter slightly larger than the diameter of the ball to be received therein. The lower end of the socket comprises the insertion opening to the cavity, and the upper end of the cavity is closed by a hemispherical portion of the socket. A C-shaped spring or clip is with its major portion located outside of the socket. The opposite end portions of the clip extend through slots in the socket and freely protrude into the cavity to come into abutment with portions of the lower hemisphere of the ball received in the cavity to thereby lock the ball in the cavity when the clip is in its locking position with its opposite end portions protruding to the inside of the cavity. The clip may be moved longitudinally in a direction away from a ball received in the socket to an assembly/disassembly position in which its opposite lower end portion are retracted through the slot to a position in which they do not extend to the inside of the cavity so that a ball can pass the opposite end portions of the clip for insertion/removal to/from the cavity. In the locking position the opposite two end portions of the clip projecting into the cavity have to withstand any forces acting on the ball in the direction to remove the ball from the cavity, i.e. the opposite end portions of the clip are the actual locking elements which have to provide the structural strength to hold the ball in the cavity. Therefore, the clip has to be made of sufficiently strong material, for example a metal such as spring steel. Therefore, the clip is made of rather expensive material compared to cheaper materials as plastics. Such clip materials are also prone to corrosion. Furthermore, a metal clip is rather heavy. In addition, the clip, with the exception of its opposite lower end portions which extend into the socket, is located outside of the socket which exposes the clip to the external environment; any part moving past the connector could engage the clip and inadvertently displace the clip to its assembly/disassembly position so that the connector opens.

It is therefore an object of the present invention to provide a ball joint connector which can be made of rather simple components so that the connector is cost effective under the aspects of material costs and less critical precision of the dimensions of the components. Furthermore, the connector should allow easy assembly/disassembly of a ball pin without special tools.

These objects are achieved by a ball joint connector comprising the features of claim 1. Preferred embodiments are set out in the dependent claims.

According to the present invention the clip is arranged to extend, in its locking position, in abutment with the surface of a ball received in the cavity on opposing sides of the ball on each side over a portion of the upper hemisphere and with its lower end portion over an adjoining surface portion of the lower hemisphere of the ball. In this manner the clip is arranged inside of the socket and is therefore not exposed to the environment. The clip is received in a groove formed in the inner wall of the cavity which groove extends in a symmetrical manner on opposite side regions of the cavity from a first end close to the opening of the cavity to a second end in the dome-shaped end wall. The depth of the groove is increasing starting from the first end to form a flaring groove bottom adapted to support the clip end portion in the locking position to keep the ball in the cavity. The increasing depth of the groove is arranged such that the opposite end portions of the clip are, in its retracted assembly/disassembly position, free to be moved radially outwardly into region of increased depth of the groove to allow the ball to pass by the end portions of the clip.

Since the opposite clip end portions are supported by the flaring groove bottom walls in the locking position of the clip, the clip does not have to be of structurally rigid and strong material since the clip can transfer any forces exerted by the ball to the groove bottom of the socket. Therefore, the clip can be made of rather cheap material such as plastic. The socket has to be of sufficiently strong material to withstand forces to be transferred through the connector and any forces that could act between ball pin and socket attempting to pull the ball pin out of the socket. The socket can be made of metal, hard plastic or composite materials. Preferably, the clip is an integrally formed member, for example made of plastic material.

In a preferred embodiment the groove extends in a plane which is parallel to but displaced from the central axis of the cylindrical cavity. Due to this off-center arrangement the clip will push the ball to the side where the ball will come into contact with a surface portion of the inner wall of the cavity so that there are three contact lines of the ball, namely along the two legs of the clip and a wall portion of the cavity opposite to the clip. This arrangement reduces any free play of the ball in the socket. Therefore production tolerances at the clip ball pin and of the socket are less critical and can be accommodated by the connector arrangement.

According to a preferred embodiment the grooves are arranged such that the depth is decreasing in an end portion adjoining the second end to form a tapering groove bottom near the second end against which the clip is pressed when it is in the assembly/disassembly position such that the contact with the tapering groove bottom generates a bias force on the clip directed to move the clip to the locking position. In this manner it is ensured that the clip returns to the locking position when a ball pin is inserted.

According to a preferred embodiment the clip comprises a central apex portion from which two leg portions extend in the symmetrical manner, wherein the inner walls of the leg portions are curved with the radius of curvature corresponding to the radius of the ball to be received in the cavity. In a preferred embodiment the central apex portion of the clip is arranged to provide a handling tab adapted to extend to a central opening in the dome-shaped end wall of the socket to allow access to the handling tab to exert a force on the clip to bring it to the retracted assembly/disassembly position if the ball pin is to be mounted/dismounted in the socket.

In a preferred embodiment such handling tab is provided by forming the central apex portion of the clip as an outwardly extending loop connecting the two leg portions.

In a preferred embodiment the clip is arranged in its shoulder regions (transition regions between apex portion and the leg portions) to cooperate with the tapering groove bottom walls against which the shoulder portions are pressed when the clip is in the assembly/disassembly position to generate a force on the leg portions which supports a pivotal outward movement of the leg portions such that the lower end portions of the clip are moved radially outward to allow the ball of the ball pin to pass. In this manner the force needed to mount or dismount the ball pin is reduced since the radial outward movement of the opposite end portion of the clip has not to be driven by the ball pin alone.

In a preferred embodiment the clip is arranged such that it comprises in its apex portion and/or adjoining shoulders at least one zone of reduced material thickness to provide a flexure hinge enabling the leg portions to be pivoted outwardly.

Preferably the clip is formed of a resilient material. This further allows that the clip compensates for production tolerances in the socket, the ball pin and the clip itself. The clip can for example be made of plastic.

In a preferred embodiment the cylindrical cavity of the socket has an inner diameter substantially corresponding to the radius of the ball to be received to allow the ball to be inserted and removed from the cavity. The dome-shaped end wall is a hemispherical end wall having a radius of curvature corresponding to the radius of the ball to be received. Preferably the cylindrical cavity comprises an outer rim portion surrounding the insertion opening with a tapering circumferential wall to simplify insertion of the ball into the cavity through the opening. This tapering circumferential wall portion enlarges the inner diameter at the opening and will guide the ball into the cavity and therefore simplify the mounting step.

In a preferred embodiment the socket has an essentially cylindrical shape with two outwardly extending flanges at both opposite faces, wherein a damper ring is received in the space between the flanges surrounding the cylindrical socket and fills this space, wherein the damper ring is enveloped and held by a cage ring to which a terminal rod of the elongated element is connectable.

In a preferred embodiment the socket is divided in a plane perpendicular to the central axis of the cylindrical cavity into a lower and an upper socket part. This structure of the socket facilitates access to the cavity to form the grooves when the lower and upper socket parts are still unconnected by introducing the tool to form the grooves through the openings of the lower and upper socket parts, respectively, which openings will then be closed thereafter when the lower and upper socket part are securely connected to each other to form the socket.

The invention will in the following be described in more detail in connection with a preferred embodiment illustrated in the drawings in which:

FIGS. 4a-4e show two cross-sectional views through the socket taken along the indicated planes D-D and E-E, respectively;

Figure 1:
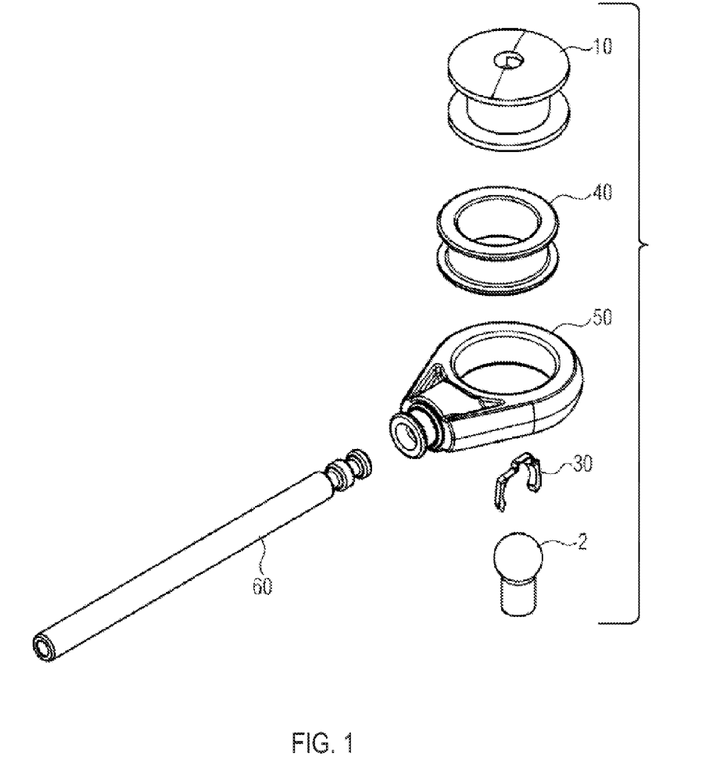
FIG. 1 shows a perspective exploded view of the main components of the connector.

FIG. 1 shows an overview of the main components of the connector in an exploded view. There is a terminal rod 60 in which one end of an elongated element, for example a cable, can be fixed. The terminal rod 60 is connectable to a cage ring 50 which is of sufficient strength to transfer the forces from the ball pin 2 via the socket 10 and damper ring 40 to the terminal rod 60. The damper ring 40 is received between two flanges and surrounds the essentially cylindrical socket 10 and fills up the space between the end flanges of the socket. The socket 10 with the surrounding damper ring 40 are enveloped and secured by cage ring 50. The damper ring 40 is of resilient material such as rubber to suppress vibration transfer through the connector.

Figure 2A:
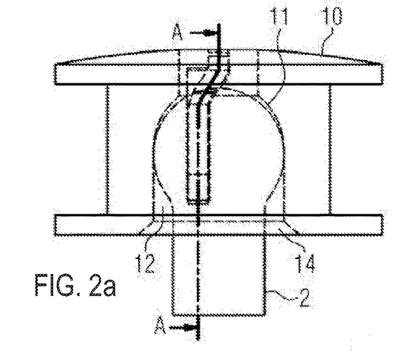
FIGS. 2a and 2b show a transparent view and a cross-sectional view of the socket of the connector of FIG. 1 with ball pin and clip present in the socket.
Figure 2B:
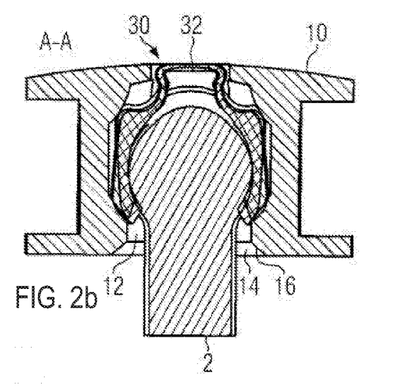

The design of the clip and the socket will now be described with reference to FIGS. 2a to 2f. FIGS. 2a and 2b show on the left hand side a transparent view of the socket 10, and on the right hand side a cross-sectional view along the plane A-A indicated on the left hand side; please note that A-A is not a plane in a strict sense but is partially curved to follow the general extension of the clip 30. The socket 10 has a cylindrical cavity 12 with an opening 14 at the one end and a dome-shaped end wall 11 at the opposite end.

The shape of the clip is best illustrated in the perspective views of FIGS. 5a-5e. The clip has a central apex portion 32 from which two leg portions 34 extend in a symmetrical manner. The leg portions 34 have curved inner surfaces which are adapted to the radius of curvature of the ball of the ball pin 2. The leg portions 34 terminate in opposite end portions 35 of the clip. Between apex portion 32 and leg portions 34 there are shoulders 36 in the transition regions between apex portion 32 and leg portions 34. The leg portions 34 extend, in the side view of the clip (see FIG. 5e), straight and in a common plane, whereas the shoulder portion 36 is slightly curved so that the upper end of the apex portion 32 is slightly displaced with respect to the plane of the leg portions 34.

This shape of the clip is designed, as can be seen in FIGS. 2a-2b in the transparent view on the left hand side, such that the upper end of the apex portion 32 of the clip is located on the central axis of the cylindrical cavity 12 of the socket, whereas the leg portions of the clip are also extending parallel to the central axis of the cavity, but in a plane displaced from the central axis of the cavity 12. In this manner the apex portion 32 of the clip can be located in the central opening 8 (see FIGS. 4a-4c) of the dome-shaped end wall.

Figure 2C:
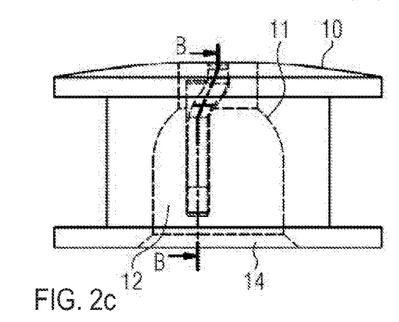
FIGS. 2c and 2d show a transparent view and a cross-sectional view as in FIGS. 2a and 2b with the ball pin removed.
Figure 2D:
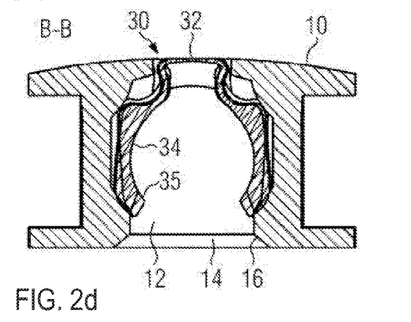

FIGS. 2c-2d correspond to FIGS. 2a-2b with the ball pin 2 removed. Again the cross-section on the right hand side is taken along a plane B-B in which the clip lies. As can be seen from FIGS. 2a-2d clip 30 is disposed within the socket 10, but the major amount of material of the clip 30 is not located inside the cylindrical cavity 12 of the socket, but within grooves formed in the inner wall of the cylindrical cavity 12. As can be seen from FIGS. 2e-2f on the right hand side two grooves 41 extend in a symmetrical manner on opposite sides in the inner wall of the cavity 12 from a first end close to the opening 14 to a second end in the dome-shaped end wall, and a symmetrical manner on the opposite side of the inner wall of the cavity 12. The depth of the groove 40 is increasing starting from the first end to form a flaring groove bottom 42. It follows a region 44 of increased depth of the groove. Closer to the second end the depth of the groove 41 is decreasing to form a tapering groove bottom 46 near the second end.

FIGS. 2a-2d show the clip in its locking position. In this position the clip 30 rests with the outer surfaces of its lower end portions 35 on the flaring groove bottom 42 (see FIGS. 2e-2f). In this manner the clip is supported in the cavity and can hold the ball pin 2 in this position (see FIGS. 2a-2b) locking the ball pin in the cavity because the opposite end portions 35 of the clip are restrained by the flaring groove bottom 42 so that they can not be moved radially outwardly or vertically downwardly so the ball pin 2 is kept locked in the socket 10.

Figure 4A:
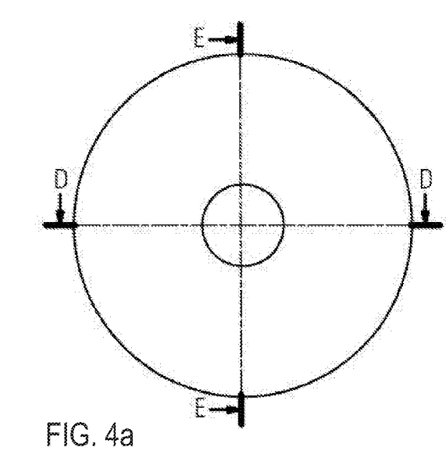
Figure 4B:
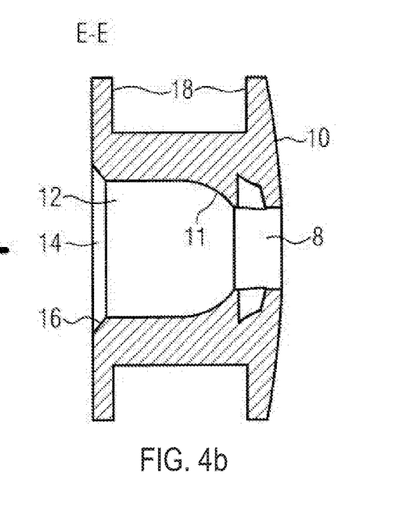
Figure 4C:
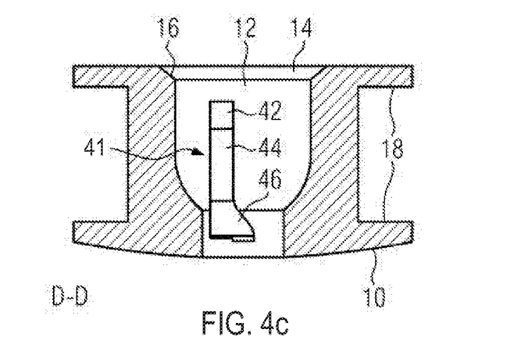
Figure 5A:
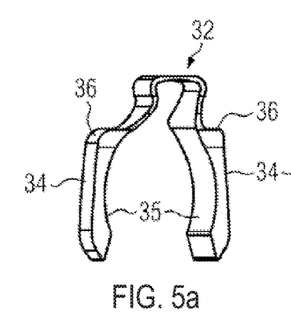
FIGS. 5a-5e show several perspective views of a clip to be used in the connector according to the embodiment described.
Figures 5B, 5C:
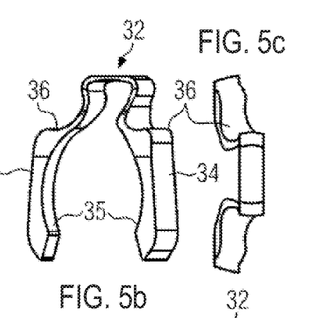
Figure 5D:
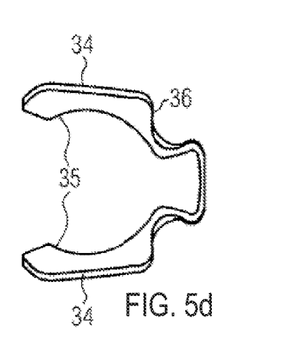
Figure 5E:
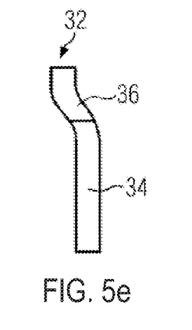

The design of the socket and the grooves is also illustrated in FIGS. 4a-4c which shows two sectional views of the socket 10 along two perpendicular planes D-D and E-E as indicated. In the section D-D one can see the cylindrical cavity 12 in the socket 10 and a groove 41 formed in the opposite side wall of the cavity 12. As can be seen here again the grooves 41 are not located on the central axis of the cavity 12 but are slightly displaced with respect to a plane including the central axis. Each groove has a flaring groove bottom 42 followed by a portion 44 of increased depth which is followed by a portion of decreasing depth 46 to form a tapering groove bottom 46 near the second end.

In the section E-E of FIGS. 4a-4c the cylindrical cavity 12 of the socket 10 is visible. However, the grooves 41 can not be seen in this cross-section because, as mentioned above, they are displaced from the central axis of the cavity 12, i.e. the leg portions 34 of the clip extend in a plane parallel to but displaced from the cross-sectional plane E-E of FIG. 4b.

FIGS. 4a-4c also show that the cylindrical cavity 12 of the socket 10 is provided with an outer rim portion 16 adjoining the opening 14 of the cavity. This outer rim portion 16 is formed with inclined walls with increasing inner diameter towards the opening 14. This inclined outer rim portion 16 serves the purpose to guide the ball into the cavity 12 when the ball pin 2 is inserted.

Figure 3:
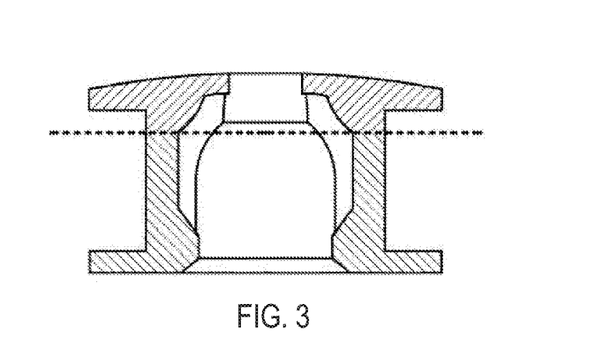
FIG. 3 shows a cross-sectional view of a socket as in FIGS. 2e and 2f according to another embodiment.

FIG. 3 shows a cross-sectional view of a socket according to a preferred embodiment in which the socket is divided in a plane perpendicular to the central axis of the cylindrical cavity 12 into a lower and an upper socket part. The lower socket part extends up to the upper end of the region 44 of increased depth of the groove. The upper socket part starts with the beginning of the tapering groove bottom 46 of the groove. The two-part arrangement of the socket 10 facilitates forming of the grooves 41 in the inner wall of the cavity 12 of the socket 10. The grooves are formed by cutting while the lower and upper socket parts are still separate which allows to introduce the cutting tool through the openings in the end portions of the lower and upper socket part, respectively, which end portions are thereafter securely connected to form the socket 10. In principle, the plane along the central axis of the cylindrical cavity at which the socket is subdivided into a lower and upper socket part could also be located at another axial position along the central axis, for example at some point along the region 44 of increased depth of the grooves 41.

The clip shown in FIGS. 5a-5e has a further feature which facilitates that the legs 34 and opposite end portions 35 are able to be pivoted outwardly, namely a zone of reduced material thickness in the apex portion 32 up to the shoulders 36. This weakened or reduced material thickness zone forms a flexure hinge which allows leg portions 34 to be pivoted outwardly. The leg portions 34 themselves may also be bent to a certain extent when the opposite end portions 35 are spread apart, but the leg portions may also have sufficient material thickness so that their bending is negligible and the opening of the leg portions 34 is enabled by the apex portion 32 as a flexure hinge.

In the following the process of mounting the ball pin to the socket and dismounting the ball pin from the socket will be described in connection with FIGS. 6a-6c and 7a-7d, respectively. Starting with FIG. 6a the ball pin 2 is beginning to be inserted into the cavity. This can be done either by pressing the socket with the inserted clip 30 downwardly on the fixed ball pin 2 or by forcing the ball pin 2 upwardly with respect to the fixed socket. Please note that in FIGS. 6a-6c and 7a-7d only the ball pin 2, the clip 30 and its receiving grooves are shown in full lines as in a cross-sectional view comparable to the view on the right hand side of FIGS. 2a-2f, whereas the remaining parts of the socket are only schematically indicated by broken lines.

Figure 6A:
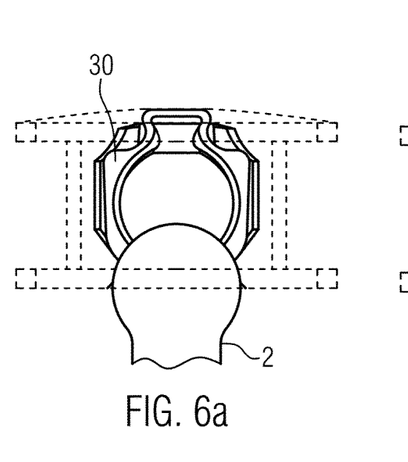
FIGS. 6a-6c schematically illustrate in three steps the process of mounting the ball pin in the socket.
Figure 6B:
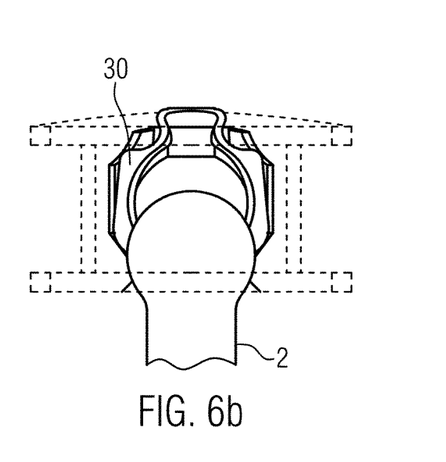
Figure 6C:
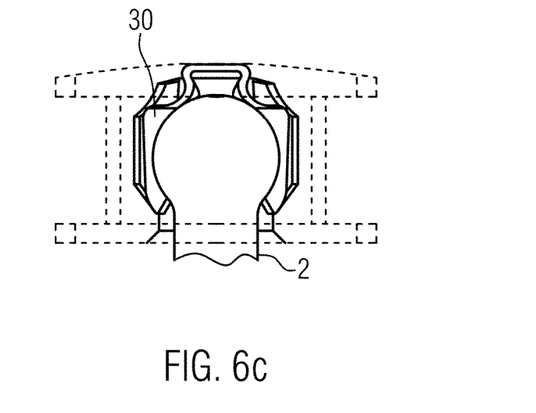

Starting with FIG. 6a the ball of the ball pin 2 is beginning to move into the cavity. During this movement the ball comes into contact with the lower ends of opposite end portions 35 of the legs of the clip 30, whereby clip 30 is urged upwardly as indicated in FIG. 6b in which clip 30 is already slightly displaced upwardly to an assembly/disassembly position of the clip 30. During this movement the outer surfaces of the opposite end portions 35 of the clip have moved along the flaring groove bottom portions 42 closer to the region of increased depth 44 of the grooves 41. In this position the opposite end portions 35 of the clip 30 can be moved radially further outwardly because further down the flaring groove bottom portion 42 more space is available. This freedom to move radially outward allows the ball of the ball pin 2 to pass the opposite end portions of the clip and to be moved into the cavity, as shown in FIG. 6c. The force exerted by the ball on the opposite lower end portions 35 contributes to the opening of the opposite end portions 35. This radial opening of the leg portions of the clip 30 to allow the ball of the ball pin 2 to pass can additionally be supported by the shoulders 36 (see FIGS. 5a-5e) of the clip 30 which are, in the view of FIG. 6b, pressed against the tapering groove bottom portion 46 (see FIGS. 2e-2f) of the grooves 41. The shape of the shoulders 36 and of the tapering groove bottom portions 46 can be adapted such that the pressure on the shoulders 36 will cause the opposite end portions 35 of the clip to be moved radially outwardly.

Figure 2E:
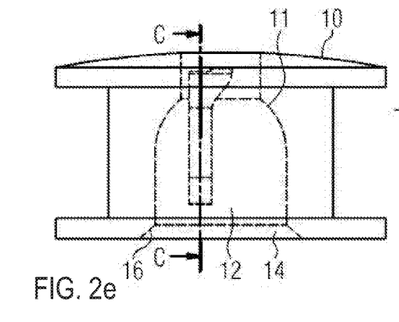
FIGS. 2e and 2f show a transparent view and a cross-sectional view as in FIGS. 2a-2d without ball pin and clip.
Figure 2F:
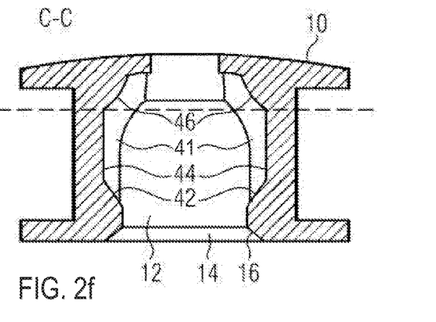

In addition the pressure exerted by the tapering bottom portions 46 of the grooves on the shoulders 36 also create a bias force on the clip 30 in downward direction so that the clip returns to the locking position in which it is pushed down, as shown in FIG. 6c, such that the outer surfaces of the opposite end portions 35 of the clip are resting on the flaring groove bottom portions 42 FIGS. 2e-2f) of the grooves. In this locking position the ball of the ball pin 2 is securely held by the clip 30 in the cavity of the socket.

Figure 7A:
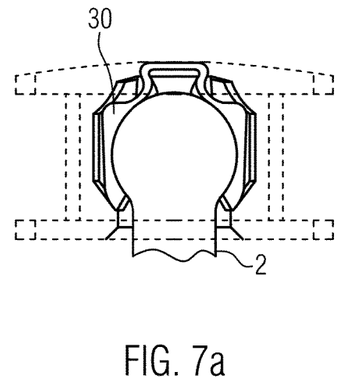
FIGS. 7a-7d schematically illustrate in four steps the process of dismounting the ball pin from the socket of the connector.
Figure 7B:
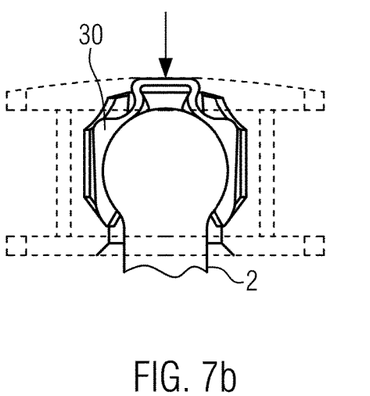
Figure 7C:
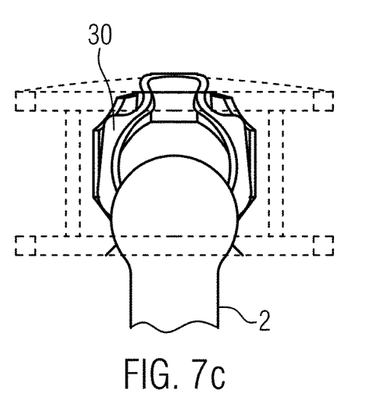
Figure 7D:
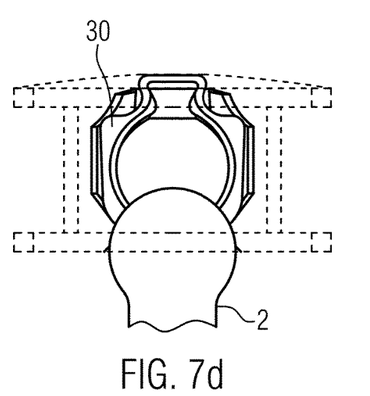

In FIG. 7a the ball pin 2 is shown again in its locked position inside the cavity of the socket. In order to dismount the ball pin from the socket 10 the socket is slightly pushed down with respect to the ball pin 2 so that the apex portion 32 (see FIGS. 5a-5e) of clip 30 becomes accessible in the central opening 8 (see FIG. 3) of the dome-shaped end wall of the socket; this situation after pushing down the socket is shown in FIG. 7b. At his stage the apex portion 32 of the clip 30 can be gripped as a handling tab and can be used to retract the clip 30 further to its assembly/disassembly position, as shown in FIG. 7c. During the movement to this position the outer surfaces of the opposite end portion 35 of the clip have moved along the flaring groove bottom 42 of the grooves 41 to a region of increased depth such that they are able to be moved radially outwardly. This radial outward movement is again supported by the shoulders 36 pressing on the tapering groove bottoms 46 due to the force pulling the clip to its retracted position. In this state the ball of the ball pin 2 can pass the opposite end portions 35 of the clip 30 and thus be removed from the cylindrical cavity 12 of the socket 10, as shown in FIG. 7d.

From this description it is clear that mounting/dismounting the ball pin in/from the socket can be done with very few and simple steps, without need for tools, and can be done very quickly which is advantageous under cost aspects. Furthermore the described connector is advantageous since the socket can be of simple design with a simply cylindrical cavity (except for the preferred tapering outer rim portion adjoining the opening) without any inwardly projecting inner wall portions close to the opening as they were needed in the prior art described in the introduction. The only structures to be formed in the socket except the cylindrical cavity are the grooves in the cavity wall, starting with an increasing depth in a direction away from the opening. Therefore, the socket can be manufactured in rather simple, cost effective process. The clip can be made of cheap material. The clip has to exhibit certain elastic properties so that the legs 34 of the clip can be opened or widened to allow the ball to pass. In addition, it is preferred that the clip is of sufficiently resilient material so that it can be deformed to compensate for production tolerances in the outer diameter of the ball and the inner diameter of the cavity. Finally, the clip is preferably disposed in a plane slightly displaced with respect to the longitudinal axis of the cylindrical cavity; in this manner the clip can compensate productions tolerances of the components by pressing the ball in a direction away from the clip into abutment with an opposing inner wall portion of the cavity to thereby avoid free play of the ball pin with the cavity.

The invention claimed is:

1. A ball joint connector for connecting an elongated element to a ball pin (2), comprising:
    a socket (10) having a cylindrical cavity (12) defining a central axis for receiving a ball of the ball pin with an opening (14) at one end and a dome-shaped end wall (11) at an opposite end with the dome-shaped end wall defining a central opening, the socket being adapted to be connectable to the elongated element; and
    a clip (30) disposed at least partially within the cavity and dimensioned to encompass, when the ball is received in the cavity, more than an upper hemisphere of the ball which is opposite to a lower hemisphere on which a pin of the ball pin is coaxially carried, said clip having a central apex portion and two opposite end portions extending from the central apex portion with the clip being moveable between a locking position, in which the clip extends with the two opposite end portions into the lower hemisphere of the ball to be in abutment with surface portions in the lower hemisphere to hold the ball secured in the cavity and a retracted assembly position in which the opposite end portions of the clip allow the ball to pass for an insertion to and removal from the cavity, wherein the central apex portion is accessible through the central opening of the dome-shaped end wall of the socket to retract the clip along the central axis into the retracted assembly position,
    wherein the clip (30) is arranged to extend, in the locking position, in abutment with a surface of the ball received in the cavity on opposing sides of the ball on each side over a portion of the upper hemisphere and with the opposite end portion of the clip over an adjoining surface portion of the lower hemisphere of the ball, and the clip (30) is received in grooves (41) formed in an inner wall of the cavity extending in a symmetrical manner on opposite side regions of the cavity from a first end of the groove close to the opening of the cavity to a second end of the groove in the dome-shaped end wall; and
    wherein a depth of each groove is increasing starting from the first end of the groove to form a flaring groove bottom (42) with the opposite end portions engaging the flaring groove bottom to support the opposite end portions in the locking position to keep the ball in the cavity, wherein the increasing depth of the groove is arranged such that the opposite end portions of the clip are free to be moved radially outwardly into a region (44) of increased depth of the groove to move to the retracted assembly position to allow the ball to pass by the opposite end portions of the clip.

2. A ball joint connector according to claim 1, wherein the groove (41) extends in a plane which is parallel to but displaced from the central axis of the cylindrical cavity (12).

3. A ball joint connector according to claim 2, wherein the socket (10) is divided in a plane perpendicular to the central axis of the cylindrical cavity (12) into a lower and an upper socket part which are securely connected to each other.

4. A ball joint connector according to claim 2, wherein the grooves (41) are arranged such that the depth is decreasing in an end portion adjoining the second end to form a tapering groove bottom (46) near the second end against which the clip (30) is pressed when the clip is in the assembly position such that contact with the tapering groove bottom (46) generates a bias force on the clip directed to move the clip to the locking position.

5. A ball joint connector according to claim 1, wherein the grooves (41) are arranged such that the depth is decreasing in an end portion adjoining the second end to form a tapering groove bottom (46) near the second end against which the clip (30) is pressed when the clip is in the assembly position such that contact with the tapering groove bottom (46) generates a bias force on the clip directed to move the clip to the locking position.

6. A ball joint connector according to claim 5, wherein the clip (30) comprises two integrally formed leg portions (34) extending from the central apex portion in a symmetrical manner, wherein inner walls of the leg portions are curved with a radius of curvature corresponding to a radius of the ball to be received in the cavity.

7. A ball joint connector according to claim 6, wherein the central apex portion (32) is arranged to provide a handling tab adapted to extend to the central opening (8) in the dome-shaped end wall (11) of the socket (10) to allow access to the handling tab.

8. A ball joint connector according to claim 7, wherein the central apex portion (32) is formed as an outwardly extending loop connecting the two leg portions, and the outwardly extending loop provides the handling tab.

9. A ball joint connector according to claim 6, wherein the clip is arranged in shoulder regions (36) in transition regions between the central apex portion (32) and the leg portions (34) to cooperate with the tapering groove bottom (46) against which the shoulder regions are pressed when the clip is in the assembly position to generate a force on the leg portions which supports a pivotal outward movement of the leg portions such that the opposite end portions of the clip are moved radially outward to allow the ball of the ball pin to pass.

10. A ball joint connector according to claim 9, wherein the clip comprises in the central apex portion (32) and/or the adjoining shoulder regions (36) at least one zone of reduced material thickness to provide a flexure hinge enabling the leg portions (34) to be pivoted outwardly.

11. A ball joint connector according to claim 1, wherein the clip is formed of resilient material.

12. A ball joint connector according to claim 1, wherein the dome-shaped end wall (11) is a hemispherical end wall having a radius of curvature corresponding to a radius of the ball to be received.

13. A ball joint connector according to claim 1, wherein the cylindrical cavity comprises an outer rim portion (16) surrounding the opening (14) of the socket with a tapering circumferential wall to simplify insertion of the ball into the cavity through the opening of the socket.

14. A ball joint connector according to claim 1, wherein the socket (10) has an essentially cylindrical shape with two outwardly extending flanges (18) at both opposite faces, wherein a damper ring (40) is received in a space between the flanges surrounding the cylindrical socket and fills the space, wherein the damper ring (40) is enveloped by a cage ring (50) to which a terminal rod (60) of the elongated element is connectable.

15. A ball joint connector according claim 1, wherein the clip (30) comprises two integrally formed leg portions (34) extending from the central apex portion in a symmetrical manner, wherein inner walls of the leg portions are curved with a radius of curvature corresponding to a radius of the ball to be received in the cavity.

* * * * *